(12) United States Patent
Matsuzaki

(10) Patent No.: US 9,225,878 B2
(45) Date of Patent: Dec. 29, 2015

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/954,018

(22) Filed: Jul. 30, 2013

(65) Prior Publication Data

US 2014/0036284 A1 Feb. 6, 2014

(30) Foreign Application Priority Data

Aug. 2, 2012 (JP) ................................. 2012-172024

(51) Int. Cl.
*H04N 1/60* (2006.01)
*H04N 1/407* (2006.01)

(52) U.S. Cl.
CPC ............... *H04N 1/60* (2013.01); *H04N 1/4078* (2013.01); *H04N 1/6033* (2013.01)

(58) Field of Classification Search
None
See application file for complete search history.

(56) References Cited

U.S. PATENT DOCUMENTS

| | | | | |
|---|---|---|---|---|
| 5,121,196 A * | 6/1992 | Hung | ............................ | 358/504 |
| 5,296,935 A * | 3/1994 | Bresler | ........................ | 358/406 |
| 5,493,321 A * | 2/1996 | Zwadlo | ........................ | 347/131 |
| 5,566,372 A * | 10/1996 | Ikeda et al. | .................... | 399/46 |
| 5,615,282 A * | 3/1997 | Spiegel et al. | ................ | 382/167 |
| 5,781,206 A * | 7/1998 | Edge | ............................... | 347/19 |
| 5,877,787 A * | 3/1999 | Edge | ............................... | 347/19 |
| 6,027,201 A * | 2/2000 | Edge | ............................... | 347/19 |
| 6,034,788 A * | 3/2000 | Sasanuma et al. | ............ | 358/406 |
| 6,204,873 B1 * | 3/2001 | Shimazaki | .................... | 347/172 |
| RE38,180 E * | 7/2003 | Edge | ............................... | 347/19 |
| 6,804,025 B1 * | 10/2004 | Ueda et al. | ..................... | 358/1.9 |
| 7,417,763 B2 * | 8/2008 | Saito | ............................. | 358/1.9 |
| 7,466,450 B2 * | 12/2008 | Matsuzaki | ..................... | 358/1.9 |
| 7,692,831 B2 | 4/2010 | Nishikawa | | |
| 7,982,908 B2 * | 7/2011 | Kita et al. | ...................... | 358/1.9 |
| 8,045,186 B2 * | 10/2011 | Sakurai | ........................ | 358/1.12 |
| 8,305,665 B2 * | 11/2012 | Sakamoto et al. | ............ | 358/518 |

(Continued)

FOREIGN PATENT DOCUMENTS

| | | |
|---|---|---|
| CN | 102253619 A | 11/2011 |
| JP | 2011-254350 A | 12/2011 |

*Primary Examiner* — Ted Barnes
(74) *Attorney, Agent, or Firm* — Canon U.S.A., Inc. IP Division

(57) ABSTRACT

An apparatus includes an image-forming unit configured to form an image, a measuring unit configured to measure the image, a control unit configured to control execution of single-color calibration to correct reproduction characteristics of a single-color formed by the image-forming unit based on a measuring result of a single-color image formed with a single-color recording agent, and execution of multi-color calibration to correct reproduction characteristics of a multi-color formed by the image-forming unit based on a measuring result of a multi-color image formed with a plurality of color recording agents, and an evaluation unit configured to evaluate single-color reproduction characteristics with reference to a target value usable to evaluate the single-color reproduction characteristics by measuring the single-color image after execution of the single-color calibration. The control unit is configured to correct reproduction characteristics of a multi-color by performing the multi-color calibration after the evaluation unit has completed the evaluation.

13 Claims, 12 Drawing Sheets

(56) References Cited

U.S. PATENT DOCUMENTS

| | | | | |
|---|---|---|---|---|
| 8,325,396 | B2* | 12/2012 | Kishimoto | 358/518 |
| 8,705,122 | B2* | 4/2014 | Matsuzaki | 358/1.9 |
| 8,724,197 | B2* | 5/2014 | Miyagi | 358/523 |
| 2003/0063275 | A1* | 4/2003 | Hubble et al. | 356/319 |
| 2004/0131371 | A1* | 7/2004 | Itagaki et al. | 399/49 |
| 2005/0146737 | A1* | 7/2005 | Ono | 358/1.9 |
| 2005/0168505 | A1* | 8/2005 | Ide et al. | 347/8 |
| 2005/0206928 | A1* | 9/2005 | Itagaki | 358/1.9 |
| 2005/0219588 | A1* | 10/2005 | Yoshida | 358/1.9 |
| 2005/0259280 | A1* | 11/2005 | Rozzi | 358/1.9 |
| 2006/0139668 | A1 | 6/2006 | Nishikawa | |
| 2009/0009817 | A1* | 1/2009 | Park et al. | 358/406 |
| 2009/0136124 | A1* | 5/2009 | Matsuzaki | 382/162 |
| 2009/0147289 | A1* | 6/2009 | Fujita | 358/1.9 |
| 2009/0296118 | A1* | 12/2009 | Tsukamoto | 358/1.9 |
| 2010/0157334 | A1* | 6/2010 | Oobayashi | 358/1.9 |
| 2010/0321747 | A1* | 12/2010 | Sakamoto et al. | 358/518 |
| 2011/0058198 | A1* | 3/2011 | Teraue | 358/1.9 |
| 2011/0075171 | A1* | 3/2011 | Hoshii | 358/1.9 |
| 2011/0194862 | A1* | 8/2011 | Shindo | 399/27 |
| 2011/0286018 | A1* | 11/2011 | Hashizume | 358/1.9 |
| 2011/0292417 | A1* | 12/2011 | Miyagi | 358/1.9 |
| 2011/0299102 | A1* | 12/2011 | Matsuzaki | 358/1.9 |
| 2012/0081441 | A1* | 4/2012 | Miyake et al. | 347/15 |
| 2012/0081768 | A1* | 4/2012 | Iguchi et al. | 358/518 |
| 2012/0086987 | A1* | 4/2012 | Tamura | 358/3.24 |
| 2012/0099169 | A1* | 4/2012 | Hyoki | 358/518 |
| 2012/0105882 | A1* | 5/2012 | Horita | 358/1.9 |
| 2012/0147393 | A1* | 6/2012 | Matsuzaki | 358/1.9 |
| 2012/0147394 | A1* | 6/2012 | Matsuzaki | 358/1.9 |
| 2012/0169719 | A1* | 7/2012 | Kim et al. | 345/419 |
| 2012/0257227 | A1* | 10/2012 | Wurster et al. | 358/1.9 |
| 2013/0003090 | A1* | 1/2013 | Sato | 358/1.9 |
| 2013/0038886 | A1* | 2/2013 | Kondo | 358/1.9 |

* cited by examiner

FIG.8

|  | C | M | Y | K | ~801 |
|---|---|---|---|---|---|
| LOW DENSITY | 0.4 | 0.4 | 0.3 | 0.6 | |
| MIDDLE DENSITY | 0.6 | 0.6 | 0.5 | 0.8 | |
| HIGH DENSITY | 0.8 | 0.8 | 0.7 | 1 | |

ERROR IN GRADATION CHARACTERISTICS

THERE IS A PROBLEM IN SINGLE-COLOR
GRADATION CHARACTERISTICS.
PLEASE RE-EXECUTE SINGLE-COLOR CALIBRATION.

NEXT

IMAGE PROCESSING APPARATUS, IMAGE PROCESSING METHOD, AND PROGRAM

BACKGROUND OF THE INVENTION

1. Field of the Invention

The present invention relates to an image processing apparatus and an image processing method that can correct a color of an image to be output from a printer, and a program that can generate image processing parameters.

2. Description of the Related Art

The recent improvement in performance of electrophotographic apparatuses can realize high image quality comparable to that of a printing machine. However, the instability of each electrophotographic apparatus tends to cause a color variation that is larger than that of a printing machine.

In general, a "single-color" calibration technique is conventionally available for an electrophotographic apparatus. The "single-color" calibration technique includes generating a look-up table (LUT) usable to correct one-dimensional gradation characteristics corresponding to each of cyan, magenta, yellow, and black (hereinafter, simply referred to as C, M, Y, and K) toners. The LUT is a table that indicates output data corresponding to respective input data segmented at specific intervals. Using the LUT is useful in expressing nonlinear characteristics to which no calculation formula is available. Further, the "single-color" is a color that is producible using a single toner of C, M, Y, or K. Performing the single-color calibration is useful to correct single-color reproduction characteristics (e.g., maximum density and gradation).

Further, as discussed in Japanese Patent Application Laid-Open No. 2011-254350, a "multi-color" calibration technique using a four-dimensional LUT is conventionally proposed. The "multi-color" is a composite color that is reproducible using a plurality of toners of red, green, and blue or gray (based on CMY). Especially, according to electrophotography, even when a one-dimensional LUT is used to correct single-color gradation characteristics, a nonlinear difference tends to occur if a plurality of toners is used to express a "multi-color." Performing the multi-color calibration is useful to correct multi-color reproduction characteristics, which can be expressed by a combination (e.g., a superposition) of a plurality of color toners.

A processing procedure including a "multi-color" calibration is described below. The processing includes printing patches on a recording medium (e.g., a paper) based on single-color chart data that is usable to perform the "single-color" calibration and reading the printed patches with a scanner or a sensor. The processing further includes comparing read patch data with target values having been set beforehand and generating a one-dimensional LUT usable to correct differences between read patch data and the target values. The processing further includes printing patches on a recording medium based on multi-color chart data that reflects the obtained one-dimensional LUT to perform the "multi-color" calibration and reading the printed patches with the scanner or the sensor. The processing includes comparing the read patch data with target values having been set beforehand and generating a four-dimensional LUT usable to correct differences between read patch data and the target values.

As mentioned above, it is conventionally feasible to realize highly accurate correction by performing the "multi-color" calibration in such a way as to correct multi-color characteristics that cannot be corrected by the "single-color" calibration.

However, according to the above-mentioned technique, the multi-color calibration can be started on condition that gradation characteristics have been already corrected in the single-color calibration. In other words, it is required to complete the single-color calibration before starting the multi-color calibration. Therefore, a long processing time is required to accomplish the multi-color calibration.

For example, if it is determined that an image obtained after the multi-color calibration is insufficient in image quality, it is difficult to identify a failure having occurred in the single-color calibration or the multi-color calibration. Accordingly, it is necessary to re-execute the single-color calibration and the multi-color calibration in this order. The working time for the entire calibration processing greatly increases.

On the other hand, constantly restarting the multi-color calibration while skipping the single-color calibration may be useful to reduce the processing time. However, in a case where the single-color calibration has not been successfully completed, the correction accuracy will deteriorate significantly in the multi-color calibration to be performed subsequently.

From the reason described above, the multi-color calibration may not be easy to use for a user in a specific situation.

SUMMARY OF THE INVENTION

According to an aspect of the present invention, an image processing apparatus includes an image forming unit configured to form an image; a measuring unit configured to measure the image formed by the image forming unit; a control unit configured to control execution of a single-color calibration to be performed to correct reproduction characteristics of a single-color formed by the image forming unit based on a measuring result obtained when the measuring unit measures a single-color image formed by the image forming unit with a single-color recording agent, and execution of a multi-color calibration to be performed to correct reproduction characteristics of a multi-color formed by the image forming unit based on a measuring result obtained when the measuring unit measures a multi-color image formed by the image forming unit with a plurality of color recording agents; and an evaluation unit configured to evaluate the single-color reproduction characteristics with reference to a target value usable to evaluate the single-color reproduction characteristics by causing the measuring unit to measure the single-color image formed by the image forming unit after the single-color calibration has been executed by the control unit, wherein the control unit is configured to correct reproduction characteristics of a multi-color by performing the multi-color calibration after the evaluation unit has completed the evaluation.

The present invention is applicable to an image processing apparatus that can perform both single-color calibration processing and multi-color calibration processing. The image processing apparatus according to the present invention evaluates characteristics corrected in the single-color calibration at the time when the single-color calibration has completed. The image processing apparatus according to the present invention determines whether to perform the multi-color calibration according to an evaluation result.

Thus, the image processing apparatus according to the present invention can prevent the working time from increasing when it is necessary to re-execute the calibration processing because of inappropriateness in the quality of an image printed after completing the multi-color calibration.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of coefficients usable to evaluate gradation characteristics according to the first exemplary embodiment.

FIG. 9 illustrates an example of a user interface (UI) screen that includes an error message to be displayed based on a gradation characteristics evaluation result according to the first exemplary embodiment.

DESCRIPTION OF THE EMBODIMENTS

Various exemplary embodiments, features, and aspects of the invention will be described in detail below with reference to the drawings.

An image processing system according to a first exemplary embodiment of the present invention is described below. In the present exemplary embodiment, the system evaluates single-color characteristics to be corrected in the single-color calibration when the system reads a chart dedicated to the multi-color calibration.

Figure 1:
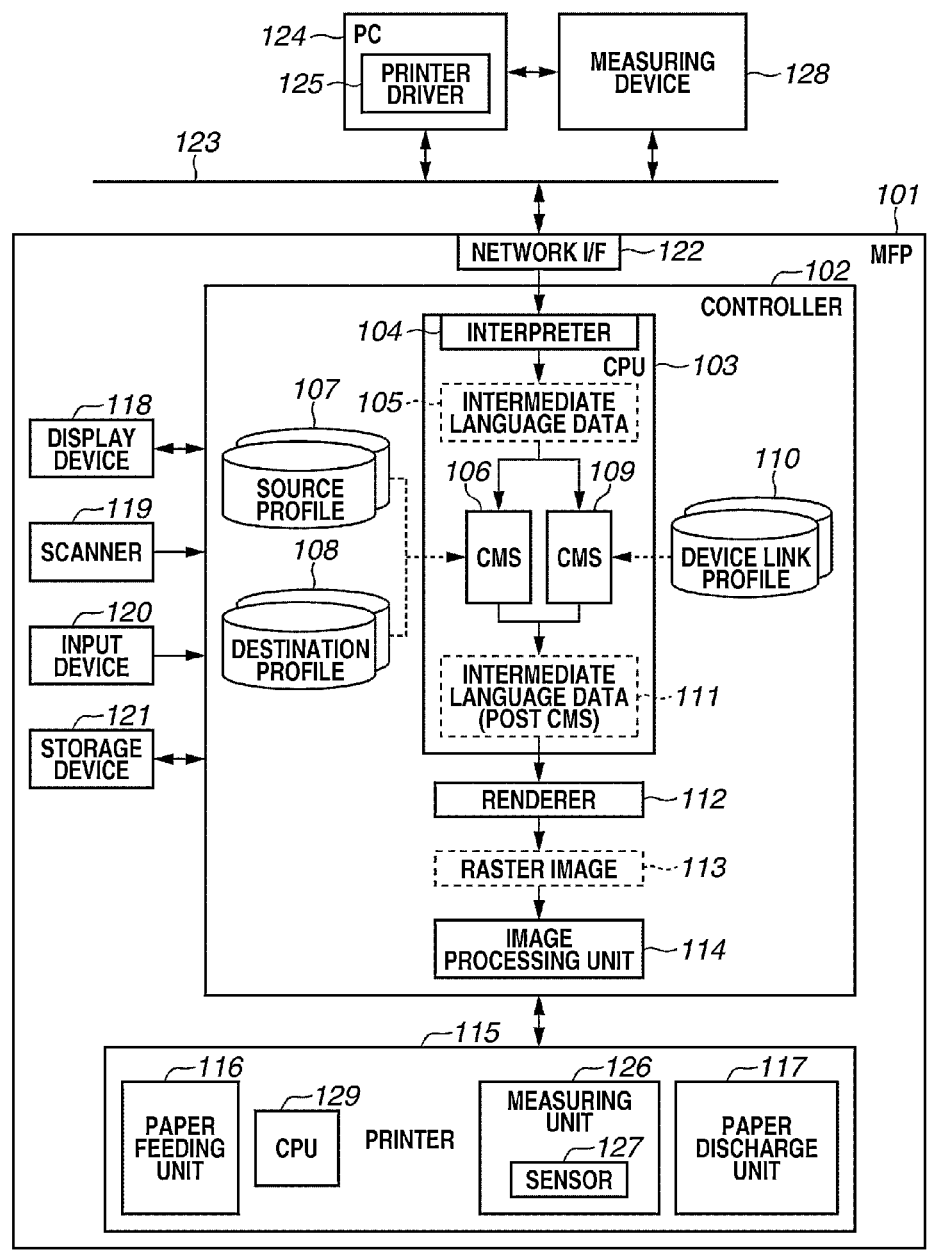
FIG. 1 illustrates a configuration of an image processing system.

FIG. 1 illustrates a configuration of the image processing system according to the present exemplary embodiment. A multi function printer (MFP) 101 is an image processing apparatus that can form images using cyan, magenta, yellow, and black (hereinafter, referred to as C, M, Y, and K) toners. The MFP 101 is connected to other network devices via a network 123. Further, a personal computer (PC) 124 is connected to the MFP 101 via the network 123. The PC 124 includes a printer driver 125 that can transmit print data to the MFP 101.

The MFP 101 is described in detail below. A network interface (I/F) 122 can receive print data. A controller 102 includes a central processing unit (CPU) 103, a renderer 112, and an image processing unit 114. The CPU 103 includes an interpreter 104 that can interpret a page description language (PDL) portion included in the received print data and generate intermediate language data 105.

A color management system (CMS) 106 can perform color conversion using a source profile 107 and a destination profile 108, and can generate intermediate language data (post CMS) 111. Profile information usable in the color conversion to be performed by the CMS 106 is described below. The source profile 107 can convert a device-dependent color space (e.g., RGB and CMYK) into a device-independent color space (e.g., L*a*b* (hereinafter, referred to as "Lab") and XYZ). Lab is the color space specified by the CIE (Commission Internationale de l'Eclairage=International Commission on Illumination). XYZ is a device-independent color space that is similar to Lab, which can express a color with three types of stimulus values. Further, the destination profile 108 is a profile that can convert a device-independent color space into a device (e.g., printer 115)-dependent CMYK color space.

On the other hand, another color management system (CMS) 109 can perform color conversion using a device link profile 110 and can generate intermediate language data (post CMS) 111. The device link profile 110 is a profile that can directly convert a device-dependent color space (e.g., RGB or CMYK) into the device (e.g., printer 115)-dependent CMYK color space. Selection of the CMS 106 or the CMS 109 is determined according to a setting by the printer driver 125.

In the present exemplary embodiment, either of color management systems (106 and 109) is provided according to the type of each profile (107, 108, or 110). However, it is useful that a single CMS is configured to process a plurality of types of profiles. Further, the type of each profile is not limited to the example described in the present exemplary embodiment. Any type of profile can be used if it can use the device-dependent CMYK color space of the printer 115.

The renderer 112 can generate raster image 113 based on the generated intermediate language data (post CMS) 111. The image processing unit 114 can perform image processing on the raster image 113 or an image read by a scanner 119. The image processing unit 114 is described in detail below.

The printer 115, which is connected to the controller 102, is a printer capable of forming an image on a paper using C, M, Y, and K color toners based on output data. The printer 115 includes a paper feeding unit 116 that can feed a paper as a recording material, a paper discharge unit 117 that can discharge a paper on which an image is formed, and a measuring unit 126.

The measuring unit 126 includes a sensor 127 that can acquire a spectral reflectance value and a device-independent color space (e.g., Lab or XYZ) value. The printer 115 includes a CPU 129 that can control various operations to be performed by the printer 115. The CPU 129 can control the measuring unit 126. The measuring unit 126 reads a patch image from a recording medium (e.g., a paper) printed by the printer 115 with the sensor 127. The measuring unit 126 transmits numerical information acquired from the patch image to the controller 102. The controller 102 performs calculations using the numerical information received from the measuring unit 126. The controller 102 performs the single-color calibration or the multi-color calibration based on a calculation result.

The MFP 101 includes a display device 118, which is operable as a user interface (UI) having the capability of displaying an instruction message directed to a user or an operational state of the MFP 101. The display device 118 can be used in the single-color calibration or the multi-color calibration.

The scanner 119 includes an auto document feeder. The scanner 119 is configured to irradiate a bundle of paper documents or a piece of paper document with light emitted from a light source (not illustrated) and cause a lens to form a reflected document image on a solid-state image sensor, such as a charge coupled device (CCD) sensor. Then, the scanner 119 obtains a raster image reading signal, as image data, from the solid-state image sensor.

The MFP 101 includes an input device 120 that is operable as an interface that can receive instructions input by a user. The input device can be partly configured as a touch panel that is integrated with the display device 118.

The MFP 101 includes a storage device 121 that stores data processed by the controller 102 and data received from the controller 102.

A measuring device 128 is an external measuring device that is connected to a network or to the PC 124. Similar to the measuring unit 126, the measuring device 128 can acquire a spectral reflectance value and a device-independent color space (e.g., Lab or XYZ) value.

Figure 2:
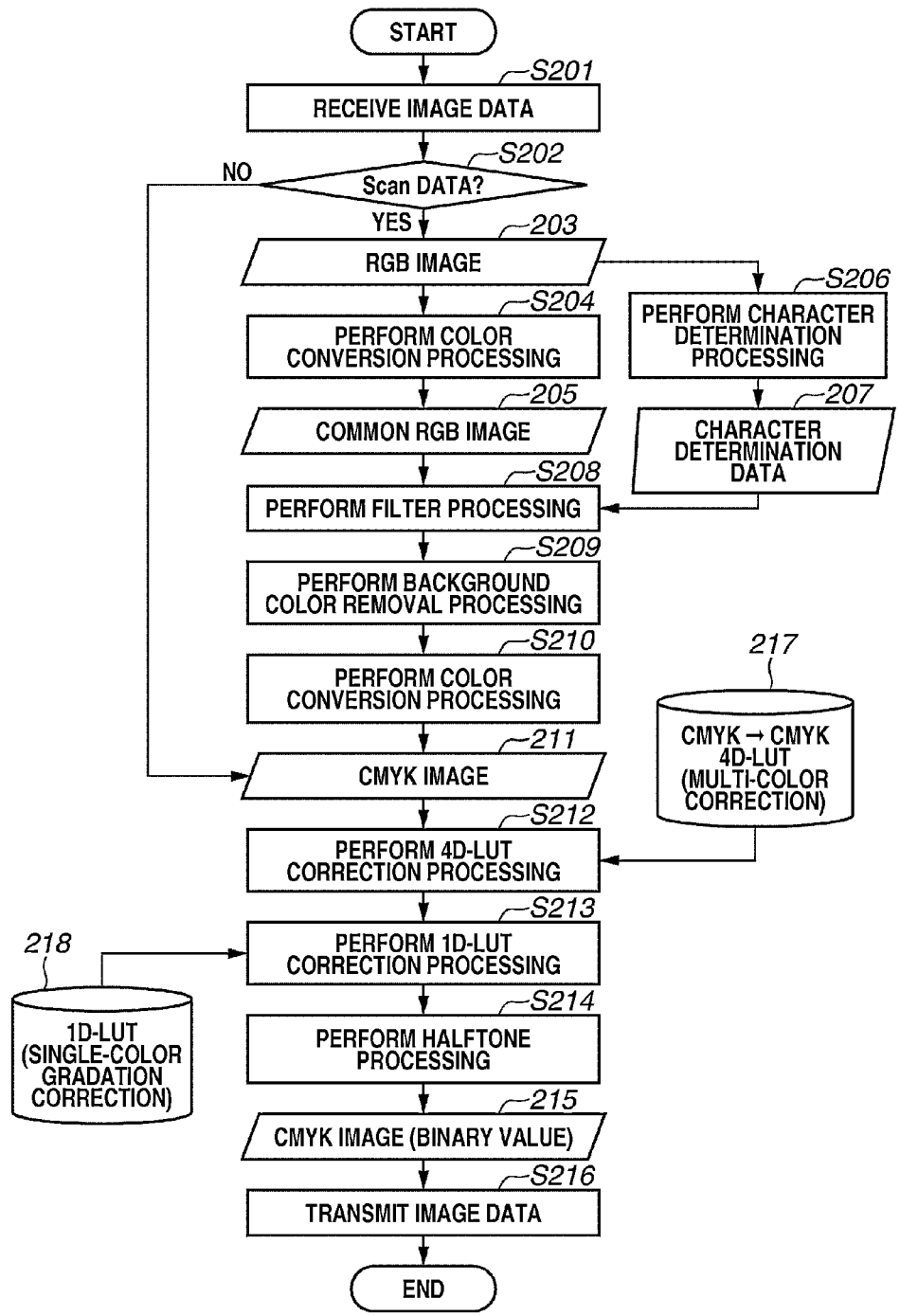
FIG. 2 is a flowchart illustrating an example procedure of image processing.

Next, an example of processing that can be performed by the image processing unit 114 is described with reference to FIG. 2. FIG. 2 is a flowchart illustrating an example of image processing applied to the raster image 113 or an image read by the scanner 119. The image processing unit 114 includes an Application Specific Integrated Circuit (ASIC) (not illustrated) that can execute the processing illustrated in FIG. 2.

In step S201, the image processing unit 114 receives image data. Then, in step S202, the image processing unit 114 determines whether the received data is scanning data received by the scanner 119 or the raster image 113 received from the printer driver 125.

If the received data is not the scanning data (NO in step S202), the received data is the raster image 113 having been bitmap rasterized by the renderer 112. The raster image 113 becomes a CMYK image 211 (which has been converted into printer device-dependent CMYK by the CMS).

If the received data is the scanning data (YES in step S202), the received data is a RGB image 203. Therefore, in step S204, the image processing unit 114 performs color conversion processing to generate a common RGB image 205. The common RGB image 205 is an image defined in a device-independent RGB color space and can be converted into a device-independent color space (e.g., Lab) through calculations.

On the other hand, in step S206, the image processing unit 114 performs character determination processing to generate character determination data 207. In the present exemplary embodiment, the image processing unit 114 detects an edge of the image to generate the character determination data 207.

Next, in step S208, the image processing unit 114 performs filter processing on the common RGB image 205 using the character determination data 207. In the present exemplary embodiment, the image processing unit 114 differentiates the filter processing applied to a character portion and the filter processing applied to the remaining portion.

Next, in step S209, the image processing unit 114 performs background color removal processing. In step S210, the image processing unit 114 performs color conversion processing to generate the CMYK image 211 from which the background has been removed.

Next, in step S212, the image processing unit 114 performs multi-color correction processing using a 4D-LUT 217. The 4D-LUT 217 is a four-dimensional look up table (LUT) that is usable to convert a combination of C, M, Y, and K signal values into a combination of different C, M, Y, and K signal values in outputting respective toners. The 4D-LUT 217 can be generated by "the multi-color calibration" described below. Thus, it becomes feasible to correct a "multi-color", i.e., a composite color obtainable using a plurality of toners, with reference to the 4D-LUT.

If the multi-color correction processing in step S212 is completed, then in step S213, the image processing unit 114 corrects single-color gradation characteristics of respective C, M, Y, and K colors, using a 1D-LUT 218. The 1D-LUT 218 is a one-dimensional lookup table (LUT) that is usable to correct each of the C, M, Y, and K colors (i.e., single-colors). The 1D-LUT 218 can be generated by "the single-color calibration" described below.

Finally, in step S214, the image processing unit 114 performs halftone processing (e.g., screen processing and/or error diffusion processing) to generate a CMYK image (binary value) 215. Then, in step S216, the image processing unit 114 transmits the processed image data to the printer 115.

An example of the "single-color calibration" for correcting single-color gradation characteristics to be output from the printer 115 is described with reference to FIG. 3. Performing the single-color calibration is useful to correct single-color reproduction characteristics (e.g., maximum density characteristics and gradation characteristics). The color reproduction characteristics corresponding to respective C, M, Y, and K toners used by the printer 115 can be corrected together when the calibration is performed. More specifically, the processing of the flowchart illustrated in FIG. 3 can be performed simultaneously for respective C, M, Y, and K colors.

Figure 3:
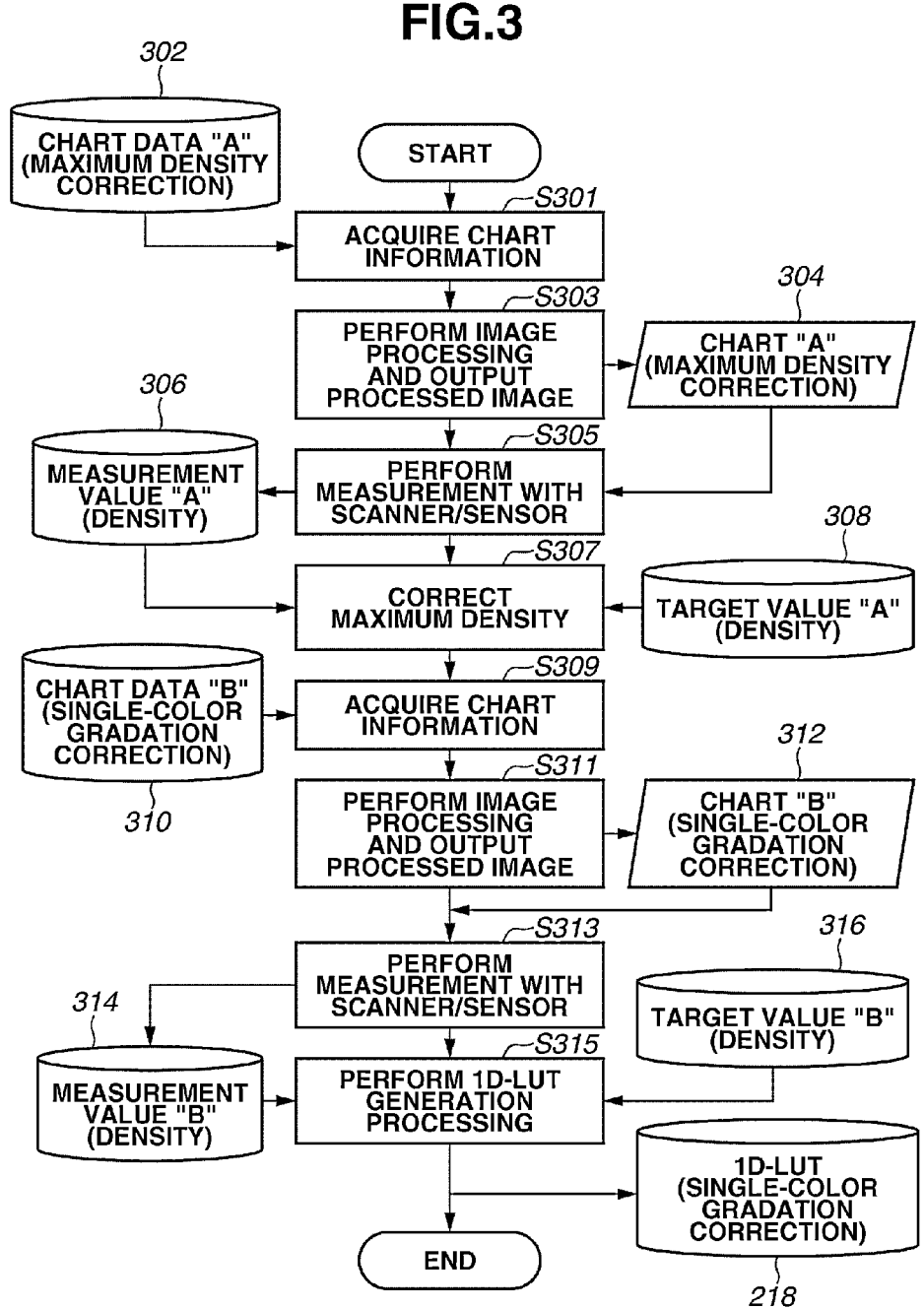
FIG. 3 is a flowchart illustrating an example procedure of single-color calibration processing.

FIG. 3 is a flowchart illustrating a processing procedure for generating the 1D-LUT 218 to be used to correct the single-color gradation characteristics. The CPU 103 performs the processing of the flowchart illustrated in FIG. 3. The storage device 121 stores the generated 1D-LUT 218. The display device 118 displays a UI screen that includes an instruction message directed to a user. The input device 120 receives an instruction from the user.

In step S301, the CPU 103 acquires chart data "A" 302 from the storage device 121. The chart data "A" 302 is usable to correct the maximum density of each single color. The chart data "A" 302 includes signal values (e.g., 255) based on which maximum density data of respective C, M, Y, and K "single-colors" can be obtained.

Figure 5A:
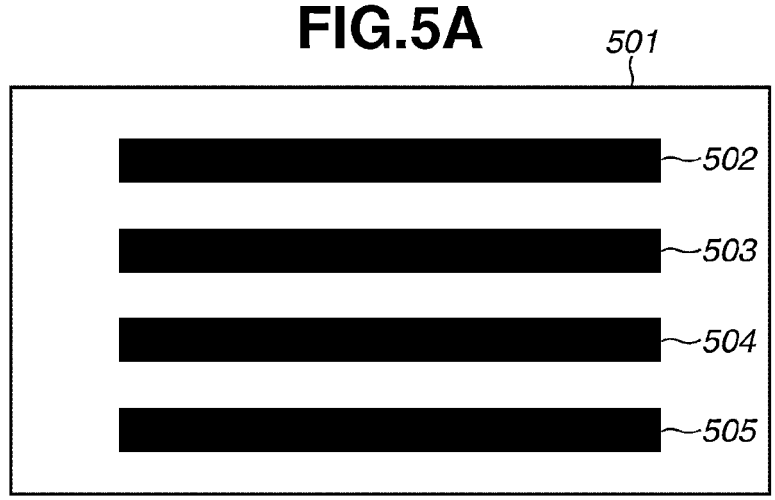
FIGS. 5A to 5C illustrate a plurality of charts that can be used in the single-color calibration and the multi-color calibration.

Next, in step S303, the CPU 103 causes the image processing unit 114 to perform image processing on the chart data "A" 302. The CPU 103 causes the printer 115 to print a chart "A" 304. FIG. 5A illustrates a chart example 501 printed based on the chart data "A" 302. The chart example 501 includes four patches 502, 503, 504, and 505 of C, M, Y, and K colors, respectively, which have been printed at their maximum densities. In this case, the image processing unit 114 performs only the halftone processing in step S214. The image processing unit 114 does not perform the 1D-LUT correction processing in step S213 and does not perform the 4D-LUT correction processing in step S212.

Next, in step S305, the CPU 103 measures the density of the printed product of the chart "A" 304 with the scanner 119 or the sensor 127 provided in the measuring unit 126, and obtains a measurement value "A" 306. The measurement value "A" 306 indicates a density value of each of the C, M, Y, and K colors. Next, in step S307, the CPU 103 corrects the maximum density of the measurement value "A" 306 of each color with reference to the measurement value "A" 306 and a target value "A" 308 of the maximum density value having been set beforehand. In the present exemplary embodiment, the CPU 103 adjusts a device setting value (e.g., laser output or development bias) of the printer 115 in such a way as to equalize the maximum density with the target value "A" 308.

Figure 5B:
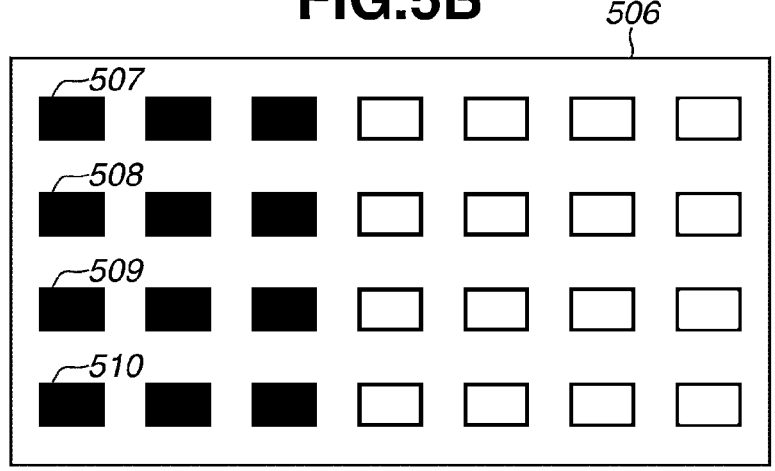

Next, in step S309, the CPU 103 acquires chart data "B" 310 from the storage device 121. The chart data "B" 310 includes signal values that represent "single-color" gradation data of C, M, Y, and K. A chart "B" 312 including patches printed on a recording medium based on the chart data "B" 310 is described below with reference to FIG. 5B. A chart example 506 illustrated in FIG. 5B is a printed product of the chart "B" 312 including a plurality of patches printed on a recording medium based on the chart data "B" 310. The chart example 506 illustrated in FIG. 5B includes four patch groups 507, 508, 509, and 510 each including a plurality of gradation data of C, M, Y, and K colors, respectively.

Next, in step S311, the CPU 103 causes the image processing unit 114 to perform image processing on the chart data "B" 310. The CPU 103 causes the printer 115 to print the chart "B" 312. In this case, the image processing unit 114 performs only the halftone processing in step S214. The image processing unit 114 does not perform the 1D-LUT correction processing in step S213 and does not perform the 4D-LUT correction processing in step S212. The printer 115 is already subjected to the maximum density correction in step S307. Therefore, in this state, the maximum density is substantially equal to the target value "A" 308.

Next, in step S313, the CPU 103 performs measurement using the scanner 119 or the sensor 127, and obtains a measurement value "B" 314. The measurement value "B" 314 indicates a density value that is obtainable from the gradation of each of C, M, Y, and K colors. Next, in step S315, the CPU 103 generates the 1D-LUT 218 to be used to correct the single-color gradation characteristics based on the measurement value "B" 314 and a target value "B" 316 having been set beforehand.

Next, an example of the "multi-color calibration" for correcting multi-color characteristics to be output from the printer 115 is described with reference to FIG. 4. Performing the multi-color calibration is useful to correct multi-color reproduction characteristics (which can be expressed using a combination (or superposition) of a plurality of color toners). The CPU 103 provided in the controller 102 can perform the following processing. The storage device 121 stores the acquired 4D-LUT 217. Further, the display device 118 displays a UI screen that includes an instruction message directed to a user, and the input device 120 receives an instruction from the user.

The multi-color calibration follows the single-color calibration, as post-processing for correcting a multi-color to be output from the printer 115. Accordingly, it is desired to perform the multi-color calibration immediately after completing the single-color calibration.

Figure 5C:
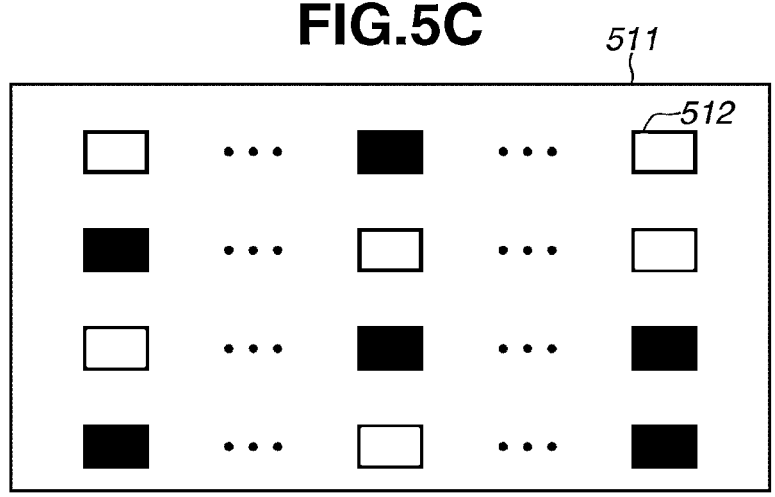

In step S401, the CPU 103 acquires information about "multi-color" chart data "C" 402 from the storage device 121. The chart data "C" 402 is usable to correct each multi-color. The chart data "C" 402 includes signal values of a "multi-color" that is a combination of C, M, Y, and K colors. A chart "C" 404 including a plurality of patches printed on a recording medium based on the chart data "C" 402 is described below with reference to FIG. 5C. FIG. 5C illustrates a chart example 511 printed based on the chart data "C" 402. A patch 512 and all patches printed on the chart example 511 is a multi-color patch configured as a combination of C, M, Y, and K colors.

Next, in step S403, the CPU 103 causes the image processing unit 114 to perform image processing on the chart data "C" 402 and causes the printer 115 to print the chart "C" 404.

In the multi-color calibration, to correct device multi-color characteristics after completing the single-color calibration, the image processing unit 114 performs image processing using the 1D-LUT 218 generated in the single-color calibration.

Next, in step S405, the CPU 103 measures a multi-color of the printed product of the chart "C" 404 with the scanner 119 or the sensor 127 provided in the measuring unit 126, and acquires a measurement value "C" 406. The measurement value "C" 406 indicates multi-color characteristics of the printer 115 at time when the single-color calibration has been completed. Further, the measurement value "C" 406 is defined in a device-independent color space. In the present exemplary embodiment, the measurement value "C" 406 is a Lab value. If the scanner 119 is used in the measurement, the CPU 103 converts an obtained RGB value into a Lab value using a 3D-LUT (not illustrated).

Next, in step S407, the CPU 103 acquires a Lab→CMY 3D-LUT 409 from the storage device 121 and generates a Lab→CMY 3D-LUT (corrected) 410 in such a way as to reflect a difference between the measurement value "C" 406 and a target value "C" 408 having been set beforehand. The Lab→CMY 3D-LUT is a three-dimensional LUT usable to output a CMY value that corresponds to an input Lab value.

As one of generation methods, the CPU 103 can add a difference between the measurement value "C" 406 and the target value "C" 408 to an input-side Lab value of the Lab→CMY 3D-LUT 409 and can perform interpolation calculation on the difference reflecting Lab value using the Lab→CMY 3D-LUT 409. Then, as a result of the interpolation calculation, the CPU 103 can generate the Lab→CMY 3D-LUT (corrected) 410.

Next, in step S411, the CPU 103 acquires a CMY→Lab 3D-LUT 412 from the storage device 121 and performs calculations using the Lab→CMY 3D-LUT (corrected) 410. Then, as a calculation result, the CPU 103 generates a CMYK→CMYK 4D-LUT 217. The CMY→Lab 3D-LUT is a three-dimensional LUT usable to output a Lab value that corresponds to an input CMY value.

A method for generating the CMYK→CMYK 4D-LUT 217 is described below. The CPU 103 generates a CMY→CMY 3D-LUT based on the CMY→Lab 3D-LUT 412 and the Lab→CMY 3D-LUT (corrected) 410. Next, the CPU 103 generates the CMYK→CMYK 4D-LUT 217 in such a way as to equalize an input value of K with an output value of K. The CMY→CMY 3D-LUT is a three-dimensional LUT usable to output a corrected CMY value that corresponds to an input CMY value.

Figure 6:
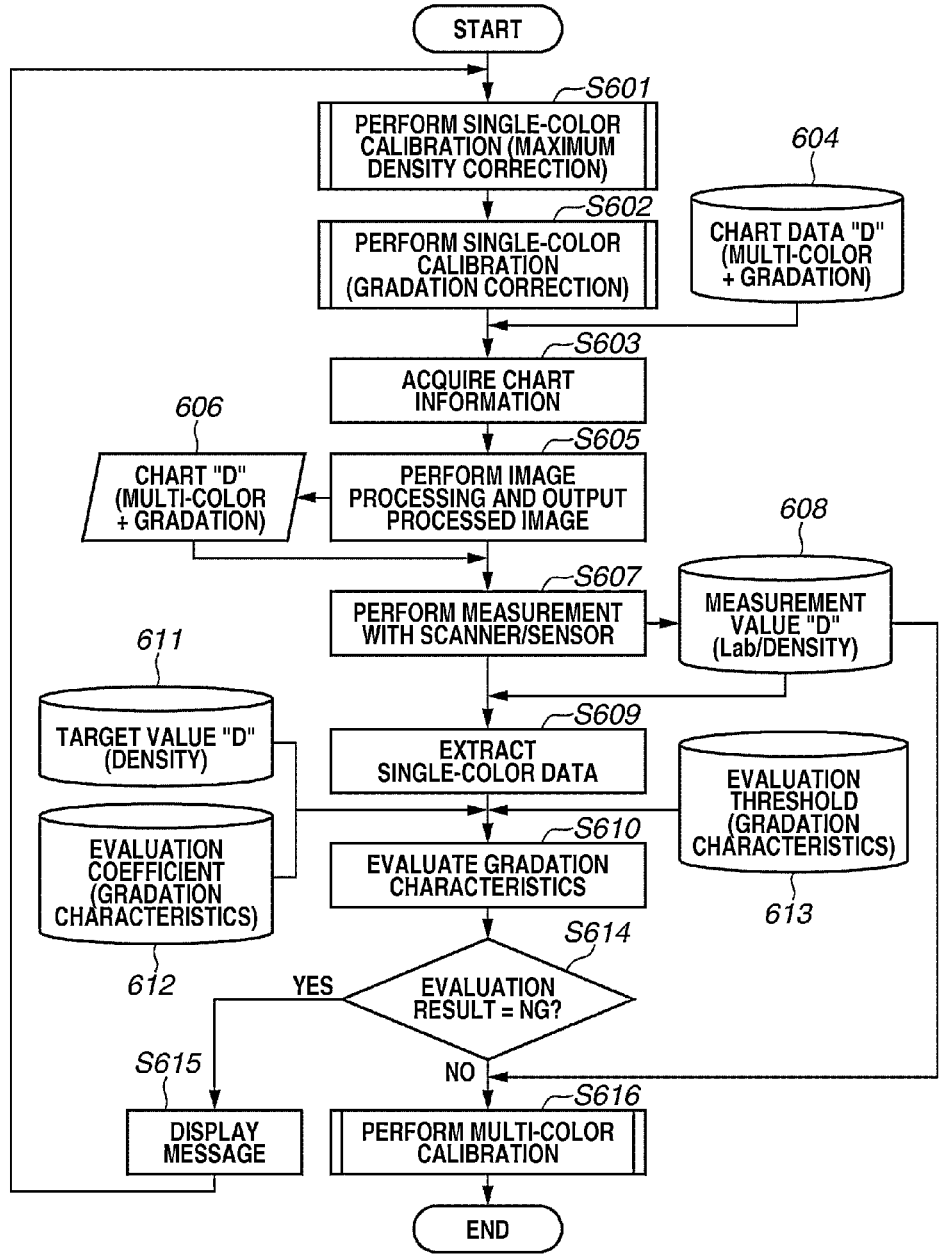
FIG. 6 is a flowchart illustrating an example procedure of calibration processing according to a first exemplary embodiment.

FIG. 6 is a flowchart illustrating an example procedure of calibration processing according to the present exemplary embodiment. The CPU 103 provided in the controller 102 performs the following processing. The storage device 121 stores the acquired data. Further, the display device 118 displays a UI screen that includes an instruction message directed to a user. The input device 120 receives an instruction from the user.

Figure 12:
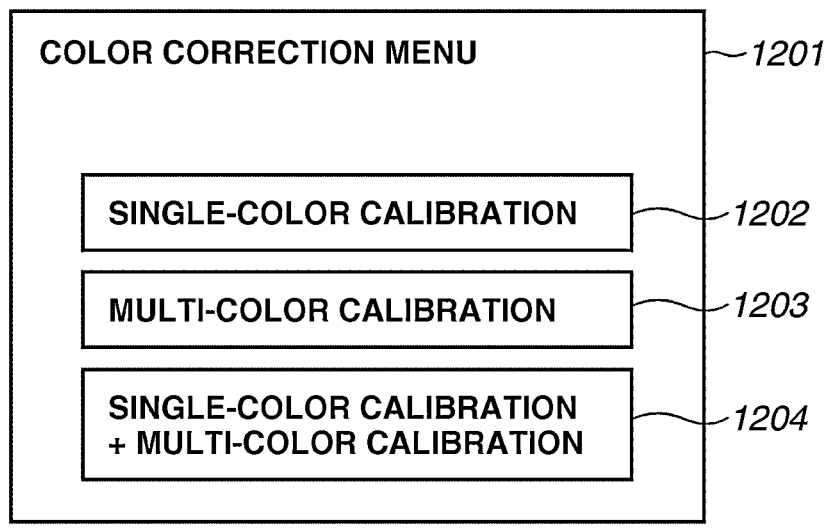
FIG. 12 illustrates a menu screen that enables a user to select the single-color calibration and/or the multi-color calibration.

First, in step S601, the CPU 103 performs single-color calibration processing to correct the maximum density. FIG. 12 illustrates a UI screen 1201 that enables a user to select the single-color calibration and/or the multi-color calibration. The display device 118 displays the UI screen 1201 illustrated in FIG. 12. A button 1202 is operable to input an instruction of starting the single-color calibration. A button 1203 is operable to input an instruction of starting the multi-color calibration. Further, a button 1204 is operable to input an instruction of performing the multi-color calibration after completing the single-color calibration.

In step S601, a user presses the button 1204 of the color correction menu illustrated in FIG. 12 to perform the single-color calibration and the multi-color calibration successively. Alternatively, the CPU 103 automatically performs the single-color calibration and the multi-color calibration successively at a predetermined timing. For example, the CPU 103 automatically starts the sequential calibration processing when a predetermined time has elapsed or a predetermined number of papers have been used in the printing, or when a power source is activated.

First, the CPU 103 starts the single-color calibration to correct the maximum density of an image formed with a single-color toner. The processing to be performed in step S601 is similar to the processing performed in steps S301 to S307 illustrated in FIG. 3 and therefore redundant description thereof will be avoided.

Next, in step S602, the CPU 103 performs single-color calibration processing to correct the gradation. More specifically, the CPU 103 generates the 1D-LUT 218 that can be used to correct the gradation of the image formed with the single-color toner. The processing to be performed in step S602 is similar to the processing performed in steps S309 to S315 illustrated in FIG. 3 and therefore redundant description thereof will be avoided.

Next, in step S603, the CPU 103 acquires information about the chart data "D" 604 relating to "multi-color" and "gradation characteristics evaluation" data from the storage device 121.

Next, in step S605, the CPU 103 causes the image processing unit 114 to perform image processing on the chart data "D" 604 and causes the printer 115 to output a chart "D" 606. As mentioned above, the CPU 103 starts the multi-color calibration to correct a multi-color to be output from the printer 115 after completing the single-color calibration. Accordingly, the image processing unit 114 performs the image processing using the 1D-LUT 218 generated in the single-color calibration.

Figure 7:
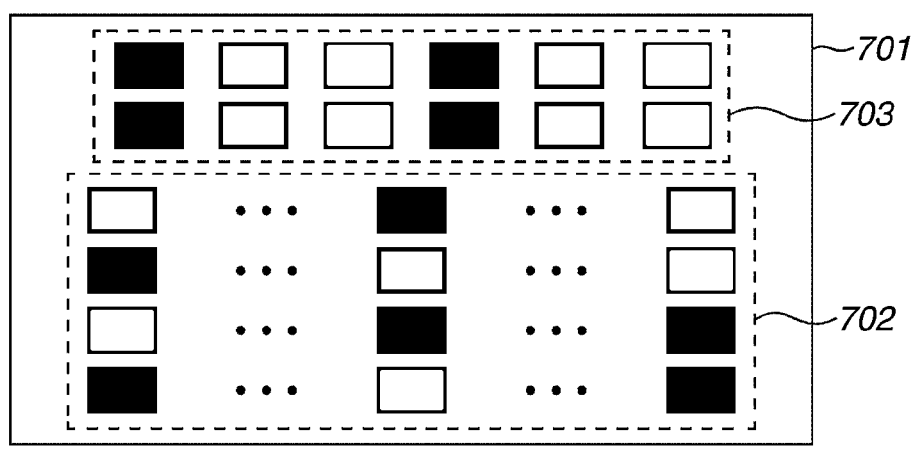
FIG. 7 illustrates a plurality of charts that can be used in the multi-color calibration according to the first exemplary embodiment.

FIG. 7 illustrates an example 701 of the chart "D" 606 that includes a plurality of patches printed on a recording medium based on the chart data "D" 604. The chart 701 includes a group of patches that can be used in multi-color correction (see a portion 702 surrounded with a dotted line), which are data constituted by "multi-color" signal values (i.e., a combination of C, M, Y, and K colors), similar to the chart data "C" 402. The chart 701 further includes a group of patches usable to evaluate single-color gradation characteristics of the printer 115 (see a portion 703 surrounded with a dotted line), which can be printed using single-color (C, M, Y, or K) data. The number of patches in this case may be smaller than that of the chart data "B" 310 because it is not intended to correct the gradation characteristics.

Further, from the reason described below, it is useful that the chart 701 includes additional data indicating signal values representing maximum densities of C, M, Y, and K colors. In the present exemplary embodiment, the CPU 103 performs multi-color correction processing and evaluates gradation characteristics using patches printed on a piece of paper. Therefore, a smaller number of patches are used to evaluate gradation characteristics, as described below. However, it is useful to print patches to be used in the multi-color correction on a chart sheet and print patches to be used in evaluating gradation characteristics on another chart sheet.

Next, in step S607, the CPU 103 measures the chart "D" 606 with the scanner 119 or the sensor 127 provided in the measuring unit 126, and acquires a the measurement value "D" 608. The measurement value "D" 608 indicates multi-color characteristics and single-color gradation characteristics of the printer 115 at the time when the single-color calibration has been completed. Further, multi-color characteristics of the measurement value "D" 608 can be expressed in a device-independent color space. In the present exemplary embodiment, the measurement value "D" 608 is a Lab value. Further, the density represents the gradation characteristics of the measurement value "D" 608. If the scanner 119 is used in the measurement, the CPU converts an obtained RGB value into a Lab value or a density value using a 3D-LUT (not illustrated).

Next, in step S609, the CPU 103 extracts single-color density data to be used in the gradation characteristics evaluation from the measurement value "D" 608. Then, in step S610, the CPU 103 evaluates single-color reproduction characteristics based on the extracted single-color density data, with reference to a predetermined target value "D" 611, an evaluation coefficient 612, and an evaluation threshold value 613.

First, a target to be evaluated in the present exemplary embodiment, as the single-color reproduction characteristics, is gradation characteristics of each single-color to be output from the printer 115. The CPU 103 determines whether the gradation characteristics have been appropriately corrected in the previously executed single-color calibration.

In the present exemplary embodiment, the target value "D" 611 is similar to the target value "B" 316 used in generating the 1D-LUT 218 for the single-color gradation correction in step S315 of the flowchart (i.e., the single-color calibration execution flow) illustrated in FIG. 3. Alternatively, the target value "D" 611 can be another value that is different from the target value "B" 316, because the chart to be used in the single-color calibration processing may be different from the data to be used in evaluating the single-color gradation characteristics. The target value used in the above-mentioned evaluation is referred to as a "target value usable to evaluate the single-color reproduction characteristics."

Further, for example, the evaluation includes measuring each single-color image output from the printer 115 after the single-color calibration has been completed, obtaining a difference value between the measurement value "D" 608 and its target value "D" 611, and determining whether the obtained difference value is greater than a threshold value.

As another example, it is useful to obtain a ratio of the measurement value "D" 608, obtainable when measuring each single-color image output from the printer 115 after the single-color calibration has been completed, to its target value "D" 611, and use the obtained ratio in the evaluation. In this case, the obtained ratio can be referred to in determining whether the measurement value "D" 608 is adjacent to the target value. For example, an evaluation can be determined by checking whether the ratio is greater than a threshold value.

As another example, it is useful to perform an evaluation using a value that can be acquired based on the comparison between the measurement value "D" 608 and its target value "D" 611.

Hereinafter, example evaluation processing including obtaining a difference value between the measurement value "D" 608 and its target value "D" 611 and determining whether the obtained difference value is greater than a threshold value is described below.

The target value "D" 611 is compatible with the characteristics evaluation data of the chart data "D" 604. In general, if an obtained measurement value "D" 608 is adjacent to its target value "D" 611, the gradation characteristics can be evaluated as good. More specifically, it means that the gradation characteristics have been appropriately corrected in the previously executed single-color calibration.

On the other hand, if an obtained measurement value "D" 608 greatly deviates from its target value "D" 611, it means that the gradation characteristics have not been appropriately corrected in the previously executed single-color calibration. The above-mentioned evaluation result is usable in determining whether performing the single-color calibration again is necessary to correct the gradation characteristics.

FIG. 8 is a table 801 including a plurality of sets of evaluation coefficients, which are applicable to four (i.e., C, M, Y, and K) types of colors. The evaluation coefficients are classified beforehand considering the color and the density. If a numerical value of the evaluation coefficient is high, it means that the corresponding color or density has a great influence on a characteristics evaluation result. In the table illustrated in FIG. 8, the density is classified into any one of three classes (i.e., low density, middle density, and high density) because the "gradation characteristics evaluation" data of the chart data "D" 604 is classified into any one of three levels.

According to the table 801, the highest evaluation coefficient is set for the high-density K color. More specifically, if the high-density K color deviates from the target value, an evaluation result of the "gradation characteristics evaluation" tends to become NG. Accordingly, if the high-density K color deviates from the target value, it will be highly necessary to perform the single-color calibration before starting the multi-color calibration.

A method for determining evaluation coefficients is described below. When the evaluation target is the "maximum density", it is useful to reduce the signal value of the CMYK image 211 if the measured patch density is excessively high. Accordingly, the measured patch density can be corrected in the 4D-LUT correction processing to be performed in the multi-color calibration processing (see step S212).

On the other hand, in a case where the measured patch density is excessively low, the signal value of the CMYK image 211 is already maximized. Accordingly, increasing the signal value is difficult. In other words, the correction cannot be performed in the 4D-LUT correction processing (see step S212). In this case, the correction requires performing the maximum density correction processing in the single-color calibration (see step S601). Accordingly, if the maximum density correction result is inappropriate, it is necessary to re-execute the single-color calibration. From the reason described above, the evaluation of the maximum density is prioritized. The maximum density gives a greatest influence on the evaluation result.

From the reason described above, it is desired that maximum density data is included in the data 703 to be used in evaluating the single-color gradation characteristics. Further, in general, a color printer is usable for monochrome printing. Therefore, the K color to be used in both color printing and monochrome printing has a higher evaluation coefficient. It is useful to change C, M, Y, and K evaluation coefficients according to the printer usage status that is variable depending on each user.

For example, if a user who frequently uses the printer in a black monochrome print mode instructs the calibration, it is useful to set the K evaluation coefficient to be high. On the other hand, if a user who frequently uses the printer in a color print mode instructs the calibration, it is useful to set the C, M, and Y evaluation coefficients to be high. The evaluation threshold value 613 is a threshold value usable to evaluate the gradation characteristics. The gradation characteristics of a data are evaluated as NG if its value exceeds the evaluation threshold value 613.

As an example method, the following formula (1) is usable to calculate a gradation characteristics evaluation value Es.

$$Es = \Sigma_{i=0}^{n} C_i * |D_t - D_m| \qquad (1)$$

n: number of gradation characteristics evaluation data, $C_i$: evaluation coefficient, $D_t$: target value (density), $D_m$: measurement value (density).

The CPU 103 compares the acquired gradation characteristics evaluation value Es with the evaluation threshold value 613. If it is determined that the gradation characteristics evaluation value Es is equal to or less than the evaluation threshold value 613, the CPU 103 evaluates the gradation characteristics of the printer 115 that has output the chart data 701 as OK. More specifically, the CPU 103 deems that the gradation characteristics have been appropriately corrected in the previously executed single-color calibration. On the other hand, if the gradation characteristics evaluation value Es is greater than the evaluation threshold value 613, the CPU 103 evaluates the gradation characteristics as NG. More specifically, the CPU 103 deems that the gradation characteristics have not been appropriately corrected in the previously executed single-color calibration.

If it is determined that the gradation characteristics evaluation result is NG (yes in step S614), then in step S615, the CPU 103 causes the display device 118 to display a message that recommends a user to restart the single-color calibration. FIG. 9 illustrates a UI screen 901 that can be displayed in step S615. The UI screen 901 includes a message indicating that there is a problem in gradation characteristics (i.e., the target to be corrected in the single-color calibration).

If the user presses a "Next" button, the CPU 103 causes the display device 118 to display the UI screen 1201 illustrated in FIG. 12 to enable the user to instruct performing the single-color calibration independently. Alternatively, the CPU 103 can automatically start the single-color calibration even when no instruction is received from the user.

If it is determined that the gradation characteristics evaluation result is OK (no in step S614), then in step S616, the CPU 103 performs multi-color calibration processing. As the button 1204 illustrated in FIG. 12 is already pressed in the beginning of the processing, the CPU 103 automatically starts the multi-color calibration processing. Alternatively, it is useful that the CPU 103 waits until the user presses the button 1203 for confirmation.

Figure 4:
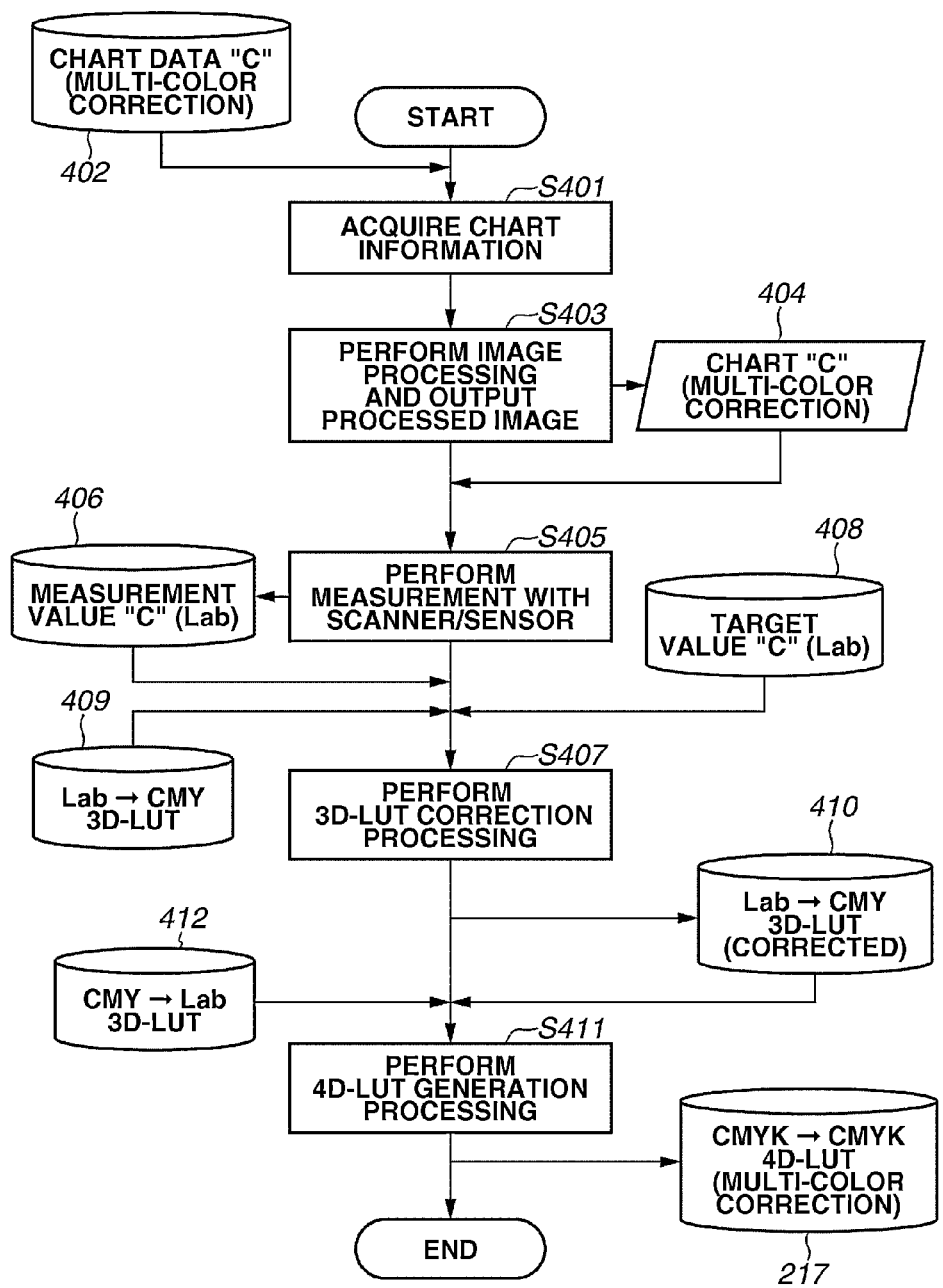
FIG. 4 is a flowchart illustrating an example procedure of multi-color calibration processing.

The multi-color calibration processing to be performed in step S616 is similar to the processing performed in steps S407 to S411 illustrated in FIG. 4 and therefore redundant description thereof will be avoided.

Further, if it is determined that the result of the implemented multi-color calibration is inappropriate, it is useful that the CPU 103 exclusively re-executes the multi-color calibration because the measuring result of the reproduction characteristics (i.e., the gradation characteristics) to be corrected in the single-color calibration is already evaluated as being appropriate.

In the present exemplary embodiment, if the gradation characteristics evaluation result is NG, the CPU 103 forcibly performs the single-color calibration processing. However, it is also useful to display a UI screen that requests a user to determine whether to perform the single-color calibration.

Further, the image processing system according to the present exemplary embodiment evaluates the gradation characteristics for each of the C, M, Y, and K colors. However, it is useful that the image processing system according to the present exemplary embodiment evaluates the gradation characteristics of a specific color only. Further, in the present exemplary embodiment, the number of data to be used in the gradation characteristics evaluation is less than the number of data used in the single-color calibration. However, the number of data to be used in the gradation characteristics evaluation can be equivalent to or larger than the number of data used in the single-color calibration. Further, it is useful to differentiate the density values to be used in the gradation characteristics evaluation for each color.

The image processing system according to the present exemplary embodiment evaluates gradation characteristics to be corrected in the single-color calibration before correcting multi-color reproduction characteristics in the multi-color calibration processing. Then, if it is determined that the evaluation result is appropriate, the image processing system according to the present exemplary embodiment performs multi-color calibration processing. Thus, it becomes feasible to improve the correction accuracy in the multi-color calibration.

Further, if it is necessary to re-execute the calibration processing because of inappropriateness in the quality of an image printed after completing the multi-color calibration, the image processing system according to the present exemplary embodiment can re-execute only the multi-color calibration processing because there is not any problem in the gradation characteristics. Therefore, it becomes feasible to shorten the working time in re-executing the calibration processing in a case where the correction result was inappropriate in the calibration including at least multi-color calibration.

In the second exemplary embodiment, if it is determined that gradation characteristics evaluation performed before starting the multi-color calibration processing reveals that the gradation characteristics corrected in the single-color calibration is inappropriate, the image processing system evaluates the correction result of the maximum density value (i.e., the reproduction characteristics target to be corrected in the single-color calibration). The image processing system determines an appropriate method according to which the single-color calibration is to be performed again.

According to the first exemplary embodiment, if the gradation characteristics evaluation result is NG at the time when the single-color calibration has been completed, the image processing system performs the single-color calibration processing again to correct the gradation characteristics.

However, even if the gradation characteristics evaluation result is NG, the correction result of the maximum density (i.e., one of the reproduction characteristics corrected in the previously executed single-color calibration) may be appropriate. In this case, the working efficiency significantly deteriorates if the maximum density correction is included in the single-color calibration to be performed again.

Accordingly, considering the above-mentioned situation, the image processing system according to the present exemplary embodiment determines an appropriate method according to which the single-color calibration processing is to be performed with reference to a maximum density evaluation result, as described below.

Figure 10:
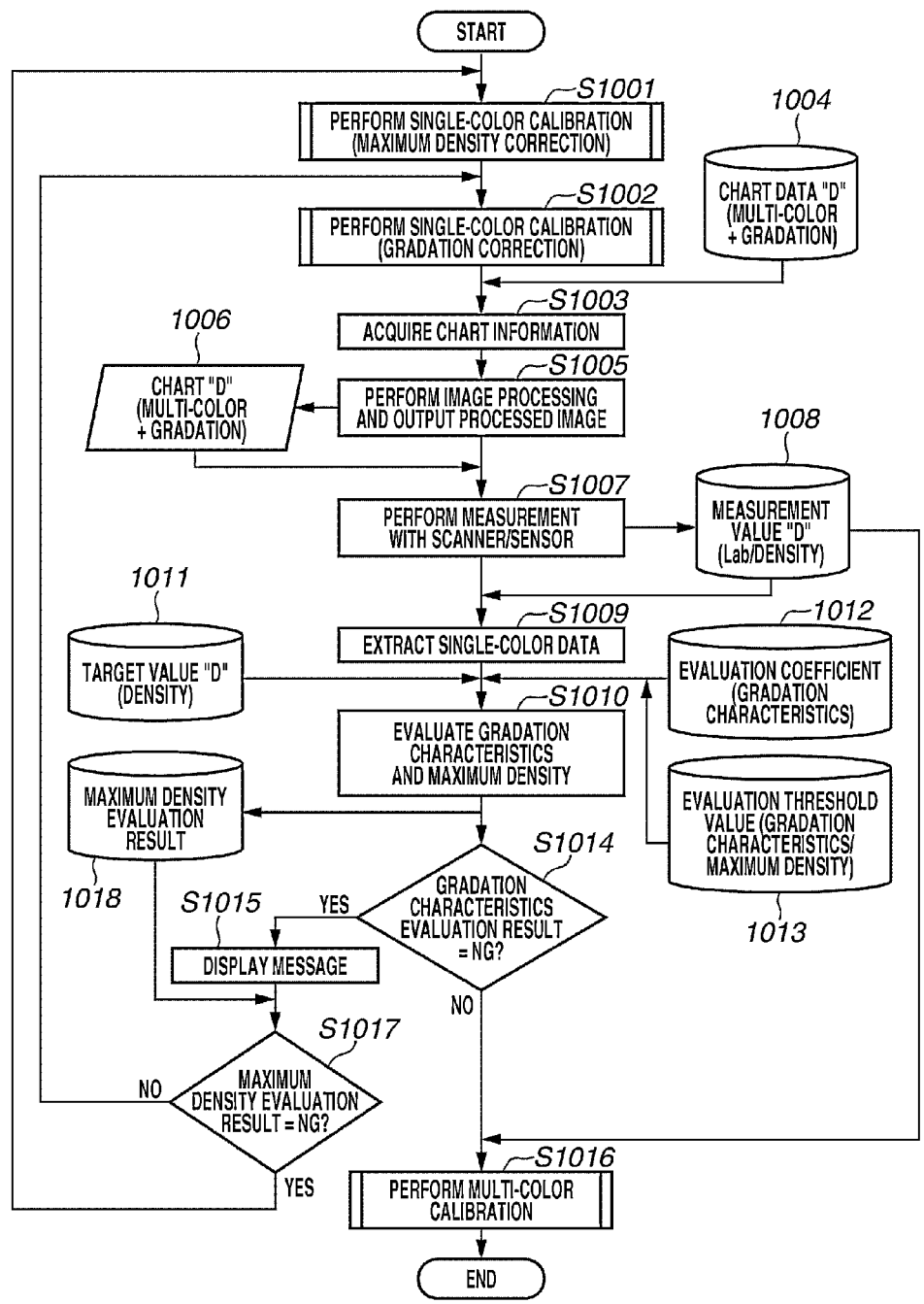
FIG. 10 is a flowchart illustrating an example procedure of calibration processing according to a second exemplary embodiment.

FIG. 10 is a flowchart illustrating an example procedure of the processing that can be performed by the image processing system according to the present exemplary embodiment. The CPU 103 provided in the controller 102 performs the processing of the flowchart illustrated in FIG. 10. The storage device 121 stores the acquired data. Further, the display device 118 displays a UI screen that includes an instruction message directed to a user. The input device 120 receives an instruction from the user.

Processing to be performed in steps S1001 to S1009 is similar to the processing performed in steps S601 to S609 and therefore redundant description thereof will be avoided.

In the present exemplary embodiment, the CPU 103 designates gradation characteristics and maximum density of each single-color to be output from the printer 115, as target single-color reproduction characteristics to be evaluated. Then, the CPU 103 determines whether these characteristics have been appropriately corrected in the previously executed single-color calibration.

In step S1010, the CPU 103 evaluates the gradation characteristics and the maximum density based on the extracted single-color density data with reference to a predetermined target value "D" 1011, an evaluation coefficient 1012, and an evaluation threshold value 1013. Then, the CPU 103 outputs a maximum density evaluation result. The gradation characteristics evaluation to be performed by the CPU 103 is similar to that described in the first exemplary embodiment and therefore redundant description thereof will be avoided.

An example of the maximum density evaluation is described below. Maximum density evaluation values of respective C, M, Y, and K colors used in the gradation characteristics evaluation can be used in the maximum density evaluation.

In the maximum density evaluation, for example, the CPU 103 uses a difference between a measurement value "D" 1008 and the target value "D" 1011. The measurement value "D" 1008 indicates a maximum density value obtainable when the density of each single-color image output from the printer 115 is measured after the single-color calibration has been completed. Then, the CPU 103 determines whether the obtained difference is greater than a predetermined threshold value. The target value "D" 1011 is similar to the target value "A" 308 having been used to correct the maximum density in step S307 of the single-color calibration execution flow illustrated in FIG. 3.

Further, the evaluation threshold value 1013 is a threshold value dedicated to the maximum density (i.e., a value having been set independently of the threshold value dedicated to the gradation characteristics).

Further, for example, it is useful to use a ratio of the measurement value "D" 1008 to the target value "D" 1011 in the maximum density evaluation. The measurement value "D" 1008 is a value indicating a maximum density value obtainable when the density of each single-color image output from the printer 115 is measured after the single-color calibration has been completed. The CPU 103 can refer to such a ratio in determining whether the measurement value "D" 1008 is adjacent to the target value "D" 1011. More specifically, in the evaluation, the CPU 103 determines whether the ratio of the measurement value "D" 1008 to the target value "D" 1011 is greater than a threshold value. Further, any value that is obtainable based on the comparison between the measurement value "D" 1008 and the target value "D" 1011 is usable in the evaluation.

In the evaluation described below, the CPU 103 obtains a difference value between the measurement value "D" 1008 and the target value "D" 1011 and determines whether the obtained difference value is greater than a threshold value.

If the measurement value "D" 1008 indicating the obtained maximum density is adjacent to the target value "D" 1011, the CPU 103 evaluates that the maximum density is appropriate. More specifically, it means that the maximum density has been appropriately corrected in the previously executed single-color calibration. To the contrary, if the measurement value "D" 1008 indicating the obtained maximum density greatly deviates from the target value "D" 1011, the CPU 103 evaluates that the maximum density is inappropriate. More specifically, it means that the maximum density has not been appropriately corrected in the previously executed single-color calibration. Using the above-mentioned evaluation result, the CPU 103 determines whether performing the single-color calibration again is necessary to correct the maximum density.

If the maximum density of the density data extracted in step S1009 is equal to or less than the threshold value, a maximum density evaluation result 1018 becomes OK. The maximum density evaluation result 1018 is an evaluated maximum density that can be output by the printer 115, which has printed a chart "D" 1006. More specifically, in this case, the CPU 103 determines that the maximum density has been appropriately corrected in the single-color calibration.

On the other hand, if the maximum density of the extracted density data is greater than the threshold value, the maximum density evaluation result 1018 becomes NG, because the maximum density output from the printer 115 having printed the chart "D" 1006 greatly deviates from the target value. More specifically, it means that the maximum density has not been appropriately corrected.

Next, in step S1014, the CPU 103 determines whether the gradation characteristics evaluation result of the printer 115 that has printed the chart "D" 1006 is NG. If it is determined that the gradation characteristics evaluation result is OK (no in step S1014), then in step S1016, the CPU 103 performs multi-color calibration processing.

If it is determined that the gradation characteristics evaluation result of the printer 115 that has printed the chart "D" 1006 is NG (yes in step S1014), then in step S1015, the CPU 103 causes the display device 118 to display a UI screen including an error message. Subsequently, in step S1017, the CPU 103 determines whether the maximum density evaluation result of the printer 115 that has printed the chart "D" 1006 is NG with reference to the maximum density evaluation result 1018. If the maximum density evaluation result is NG (yes in step S1017), namely, if the maximum density correction is insufficient, then in step S1001, the CPU 103 performs the single-color calibration processing again to correct the maximum density.

If the maximum density evaluation result is OK (no in step S1017), namely if the maximum density correction has been appropriately performed, then in step S1002, the CPU 103 performs the single-color calibration processing again to correct the gradation characteristics. In this case, it is useful that the CPU 103 controls the display device 118 to display a UI screen that notifies a user of skipping the maximum density correction because the maximum density is currently appropriate.

In this case, to re-execute the single-color calibration, the CPU 103 can control the display device 118 to display the UI screen illustrated in FIG. 12 to enable a user to instruct performing the single-color calibration again. Alternatively, the CPU 103 can automatically start the single-color calibration again.

As described above, the image processing system according to the present exemplary embodiment evaluates the maximum density and the gradation characteristics to be corrected in the single-color calibration before starting the multi-color calibration to correct multi-color characteristics. Then, the image processing system according to the present exemplary embodiment performs the multi-color calibration processing only when the evaluation result is good. Thus, it becomes feasible to improve the correction accuracy in the multi-color calibration.

Further, if it is necessary to re-execute the calibration processing because of inappropriateness in the quality of an image printed after completing the multi-color calibration, the image processing system according to the present exemplary embodiment can re-execute only the multi-color calibration processing because there is not any problem in the gradation characteristics. Therefore, it becomes feasible to shorten the working time in re-executing the calibration processing in a case where the correction result was inappropriate in the calibration including at least multi-color calibration.

Further, the image processing system according to the present exemplary embodiment determines whether the maximum density evaluation result is NG if the gradation characteristics evaluation result is NG. If it is determined that the maximum density correction is appropriate, the image processing system skips the maximum density correction processing in performing the single-color calibration. Thus, the working efficiency can be improved.

An image processing system according to the third exemplary embodiment regenerates a single-color calibration chart to be printed based on an evaluation result in a case where a single-color gradation characteristics evaluation result of the printer 115 is NG. Then, the image processing system according to the present exemplary embodiment performs single-color calibration using the regenerated chart.

In the above-mentioned exemplary embodiment, the CPU 103 performs the single-color calibration processing again if the gradation characteristics evaluation result of a printer is NG.

However, even in a case where the gradation characteristics evaluation result is NG, there is a possibility that the gradation characteristics evaluation result of only a specific color is NG. In this case, re-executing the single-color calibration for all of the evaluated colors is not efficient and not desired because color materials (e.g., toners) are excessively or uselessly consumed.

Considering the above-mentioned situation, the image processing system according to the present exemplary embodiment regenerates a chart for a single-color if the gradation characteristics evaluation result is NG or if both the gradation characteristics evaluation result and the maximum density evaluation result are NG. Then, the image processing system according to the present exemplary embodiment performs single-color calibration processing using the regenerated chart.

Figure 11:
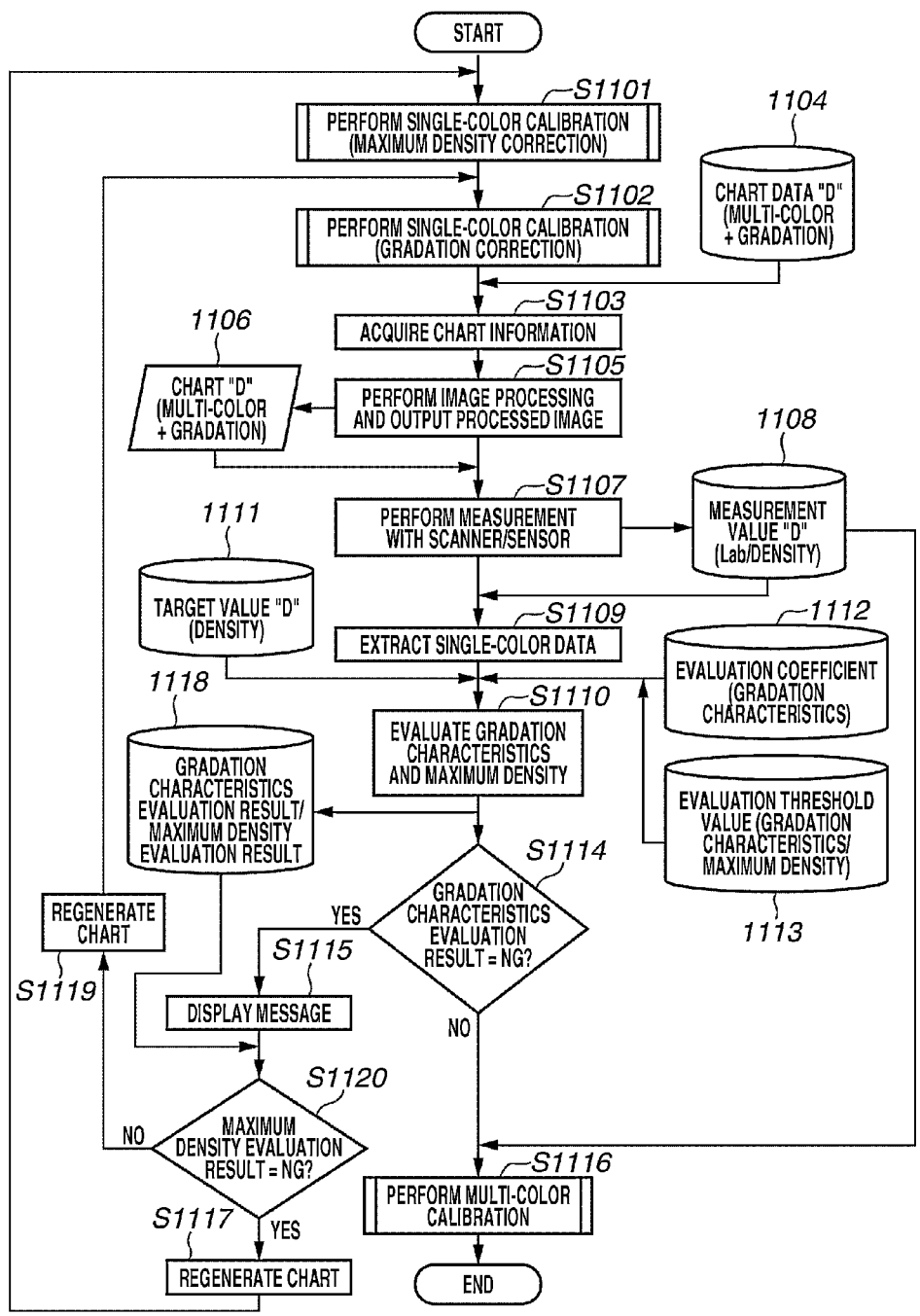
FIG. 11 is a flowchart illustrating an example procedure of calibration processing according to a third exemplary embodiment.

FIG. 11 is a flowchart illustrating an example procedure of the processing that can be performed by the image processing system according to the present exemplary embodiment. The CPU 103 provided in the controller 102 performs the processing of the flowchart illustrated in FIG. 11. The storage device 121 stores the acquired data. Further, the display device 118 displays a UI screen that includes an instruction message directed to a user. The input device 120 receives an instruction from the user.

Processing to be performed in step S1101 to step S1109 is similar to the processing performed in steps S601 to S609 and therefore redundant description thereof will be avoided.

Next, in step S1110, the CPU 103 evaluates the gradation characteristics and the maximum density based on the extracted single-color density data with reference to a predetermined target value "D" 1111, an evaluation coefficient 1112, and an evaluation threshold value (i.e., gradation characteristics and maximum density) 1113.

Then, the CPU 103 outputs a gradation characteristics evaluation result and a maximum density evaluation result 1118. The gradation characteristics evaluation result and the maximum density evaluation result 1118 can be acquired by calculating the evaluation value Es according to the formula (I) for each color. The evaluation result 1118 is usable to identify a color whose gradation characteristics result is NG.

Next, in step S1114, the CPU 103 determines whether the gradation characteristics evaluation result is NG. If it is determined that the gradation characteristics evaluation result is OK (no in step S1114), then in step S1116, the CPU 103 performs multi-color calibration processing. If it is determined that the gradation characteristics evaluation result is NG (yes in step S1114), then in step S1115, the CPU 103 causes the display device 118 to display the error message screen 901 illustrated in FIG. 9. Subsequently, in step S1120, the CPU 103 acquires the maximum density evaluation result with reference to the evaluation result 1118.

If it is determined that the maximum density of the density data extracted in step S1109 is equal to or less than the threshold value, the maximum density evaluation result 1118 of the printer 115 that has printed the chart "D" 1106 becomes OK. More specifically, the CPU 103 determines that the maximum density has been appropriately corrected in the single-color calibration. On the other hand, if it is determined that the maximum density of the extracted density data is greater than the threshold value, the maximum density of the printer 115 that has printed the chart "D" 1106 greatly deviates from the target value. Therefore, the maximum density evaluation result 1118 becomes NG. More specifically, the CPU 103 determines that the maximum density has not been appropriately corrected.

If the maximum density evaluation result is NG (yes in step S1120), the operation returns to step S1101 because it is necessary to further correct the maximum density. After completing the single-color calibration to correct the maximum density, the CPU 103 starts single-color calibration to correct the gradation characteristics. In this case, to re-execute the single-color calibration, the CPU 103 can control the display device 118 to display the UI screen illustrated in FIG. 12 to enable a user to instruct performing the single-color calibration again. Alternatively, the CPU 103 can automatically start the single-color calibration again.

Further, if it is determined to re-execute the single-color calibration (yes in step S1120), then in step S1117, the CPU 103 regenerates chart data with reference to the gradation characteristics evaluation result 1118 and causes the printer 115 to output a chart based on the regenerated chart data. The chart data re-generated in step S1117 includes only the data of a color whose gradation characteristics evaluation value acquired from the evaluation result 1118 is determined as being NG. Based on the printed regenerated chart data, the CPU 103 performs the single-color correction in step S1101 and performs the gradation correction in step S1102.

Further, if it is determined that the maximum density evaluation result is OK (no in step S1120), the CPU 103 determines that the maximum density has been appropriately corrected. Accordingly, the operation returns to step S1102 to perform the single-color calibration to correct the gradation characteristics.

In this case, it is useful that the CPU 103 controls the display device 118 to display a UI screen that notifies a user of skipping the maximum density correction because the maximum density is currently appropriate.

As described above, when the CPU 103 performs the single-color calibration again while skipping the maximum density correction, the CPU 103 regenerates chart data with reference to the gradation characteristics evaluation result 1118 in step S1119 and causes the printer 115 to output a chart based on the regenerated chart data. The chart data re-generated in step S1119 includes only the data of a color whose gradation characteristics evaluation value acquired from the evaluation result 1118 is determined as being NG. Based on the printed regenerated chart data, the CPU 103 performs single-color calibration processing to correct the gradation characteristics in step S1102.

The image processing system according to the present exemplary embodiment acquires a gradation characteristics evaluation result for each color. However, it is also useful that the image processing system acquires a gradation characteristics evaluation result for each density (e.g., low density, middle density, or high density) level and regenerates chart data based on the data whose evaluation result is determined as being NG. Further, it is also useful that the image processing system regenerates chart data based on two types of (e.g., color and density) information.

The image processing system according to the present exemplary embodiment evaluates gradation characteristics to be corrected in the single-color calibration before starting the multi-color calibration to correct multi-color characteristics. Then, the image processing system performs the multi-color calibration processing only when the evaluation result is good. Thus, it becomes feasible to improve the correction accuracy in the multi-color calibration.

Further, if it is necessary to re-execute the calibration processing because of inappropriateness in the quality of an image printed after completing the multi-color calibration, the image processing system can re-execute only the multi-color calibration processing because there is not any problem in the gradation characteristics. Therefore, it becomes feasible to shorten the working time in re-executing the calibration processing in a case where the correction result was inappropriate in the calibration including at least multi-color calibration.

Further, the image processing system according to the present exemplary embodiment regenerates chart data dedicated to the single-color calibration for data if it is determined that the gradation characteristics evaluation result is NG or if it is determined that both the gradation characteristics evaluation result and the maximum density evaluation result are NG. Thus, the color materials (e.g., toners) are not excessively or uselessly consumed. The calibration can be efficiently performed.

<Other Exemplary Embodiment>

The present invention can be realized by executing the following processing. More specifically, the processing includes supplying a software program that can realize the functions of the above-mentioned exemplary embodiments to a system or an apparatus via a network or an appropriate storage medium, and causing a computer (or a CPU or a micro-processing unit (MPU)) of the system or the apparatus to read and execute the program.

Further, the present invention is applicable to an inkjet printer or a thermal printer although the above-mentioned exemplary embodiment has been described based on an electrophotographic apparatus. The scope of the present invention is not limited to a specific printer type. Further, the toner is an example of the recording agent usable in electrophotographic printing. However, any other appropriate recording agent (e.g., ink) is usable in the printing. The scope of the present invention is not limited to a specific recording agent type.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-172024, filed Aug. 2, 2012, which is hereby incorporated by reference herein in its entirety.

What is claimed is:

1. An image processing apparatus comprising:
an image forming unit configured to form an image;
a measuring unit configured to measure the image formed by the image forming unit;
a control unit configured to control execution of a single-color calibration to be performed to correct single-color reproduction characteristics of the image forming unit based on a measuring result obtained when the measuring unit measures a single-color image formed by the image forming unit with a single-color recording agent, and execution of a multi-color calibration to be performed to correct multi-color reproduction characteristics of the image forming unit based on a measuring result obtained when the measuring unit measures a multi-color image formed by the image forming unit with a plurality of color recording agents;
an acquisition unit configured to, in response to receiving an instruction for causing the control unit to successively execute the single-color calibration and the multi-color calibration, cause the measuring unit to measure a single-color image formed by the image forming unit after the single-color calibration has been executed by the control unit, and then acquire a difference between a target value for evaluating the single-color reproduction characteristics and a measured value obtained by measuring the single-color image formed by the image forming unit after the single-color calibration;
an evaluation unit configured to evaluate the single-color reproduction characteristics by using the difference acquired by the acquisition unit; and
a switch unit configured to, if the evaluation unit evaluates the single-color reproduction characteristics as being appropriate based on the difference acquired by the acquisition unit, cause the control unit to execute the multi-color calibration according to the received instruction, and if the evaluation unit evaluates the single-color reproduction characteristics as being inappropriate based on the difference acquired by the acquisition unit, switch processing so as to cause the control unit to execute the single-color calibration again without following the received instruction.

2. The image processing apparatus according to claim 1, wherein the acquisition unit is configured to acquire a difference between a gradation value of the single-color image formed by the image forming unit after the single-color calibration and a target value for evaluating the single-color reproduction characteristics, the target value corresponding to the gradation value, and the control unit is configured to perform the single-color calibration again if the evaluation unit evaluates that the gradation value of the single-color image formed by the image forming unit after the single-color calibration is inappropriate.

3. The image processing apparatus according to claim 2, wherein the evaluation unit is configured to evaluate that the gradation value of the single-color image formed by the image forming unit after the single-color calibration is inappropriate if it is determined that the difference is greater than a threshold value.

4. The image processing apparatus according to claim 1, wherein the measuring unit is configured to measure a chart formed by the image forming unit after the control unit completes the single-color calibration, and the evaluation unit is configured to evaluate a gradation of a single color obtained as a result of the measurement.

5. The image processing apparatus according to claim 4, wherein the number of patches included in the chart formed by the image forming unit after the control unit completes the single-color calibration is smaller than the number of patches to be printed on a chart used when the control unit performs the single-color calibration.

6. The image processing apparatus according to claim 1, wherein a chart to be formed by the image forming unit to enable the evaluation unit to evaluate a gradation of the single color after the control unit completes the single-color calibration is printed together with a chart to be generated to perform the multi-color calibration on the same paper.

7. The image processing apparatus according to claim 1, wherein the acquisition unit is configured to acquire a difference between a maximum density value of the single-color image formed by the image forming unit after the single-color calibration and a target value for evaluating the single-color reproduction characteristics, the target value corresponding to the maximum density value, and the control unit is configured to perform the single-color calibration again if the evaluation unit evaluates that the maximum density value of the single-color image formed by the image forming unit after the single-color calibration is inappropriate.

8. The image processing apparatus according to claim 7, wherein the evaluation unit is configured to evaluate that the maximum density value of the single-color image formed by the image forming unit after the single-color calibration is inappropriate if it is determined that the difference is greater than a threshold value.

9. The image processing apparatus according to claim 1, wherein the evaluation unit is configured to evaluate a maximum density of a single color obtained when the measuring unit measures a chart formed by the image forming unit after the control unit completes the single-color calibration.

10. The image processing apparatus according to claim 1, wherein the acquisition unit is configured to acquire a first difference between a gradation value of the single-color image formed by the image forming unit after the single-color calibration and a target value for evaluating the single-color reproduction characteristics, the target value corresponding to the gradation value, and a second difference between a maximum density value of the single-color image formed by the image forming unit after the single-color calibration and a target value for evaluating the single-color reproduction characteristics, the target value corresponding to the maximum density value, and the control unit is configured to perform the single-color calibration again while correcting a gradation value of an image formed by the image forming unit, without correcting a maximum density value of the image formed by the image forming unit, if the evaluation unit evaluates by using the second difference that the maximum density value of the single-color image formed by the image forming unit after the single-color calibration is appropriate even when the evaluation unit evaluates by using the first difference that the gradation value of the single-color image formed by the image forming unit after the single-color calibration is inappropriate.

11. The image processing apparatus according to claim 1, wherein if the evaluation unit evaluates that the single-color reproduction characteristics of a specific color are inappropriate, the control unit is configured to perform the single-color calibration again using a chart formed by the image forming unit with the corresponding single-color.

12. A calibration method for an image processing apparatus, comprising:
   forming a single-color image with a single-color recording agent;
   measuring the formed single-color image;
   performing a single-color calibration to correct single-color reproduction characteristics of the forming based on a measuring result obtained by the measuring;
   measuring a single-color image formed by the forming after the single-color calibration has been performed, and then acquiring a difference between a target value for evaluating the single-color reproduction characteristics and a measured value obtained by measuring the single-color image formed after the single-color calibration, in response to receiving an instruction for successively executing the single-color calibration and the multi-color calibration;
   evaluating the single-color reproduction characteristics by using the acquired difference;
   performing, after the evaluating, a multi-color calibration to correct multi-color reproduction characteristics of the forming based on a measuring result obtained when the measuring measures a multi-color image formed by the forming with a plurality of color recording agents;
   executing the multi-color calibration according to the received instruction if the single-color reproduction characteristics are evaluated as being appropriate based on the acquired difference; and
   switching processing so as to execute the single-color calibration again without following the received instruction if the single-color reproduction characteristics are evaluated as being inappropriate based on the acquired difference.

13. A non-transitory computer readable storage medium storing a program that causes an image processing apparatus to perform a calibration method, the program comprising:
   computer-executable instructions for forming a single-color image with a single-color recording agent;
   computer-executable instructions for measuring the formed single-color image;
   computer-executable instructions for performing a single-color calibration to correct single-color reproduction characteristics of the forming based on a measuring result obtained by the measuring;
   computer-executable instructions for measuring a single-color image formed by the forming after the single-color calibration has been performed, and then acquiring a difference between a target value for evaluating the single-color reproduction characteristics and a measured value obtained by measuring the single-color image formed after the single-color calibration, in response to receiving an instruction for successively executing the single-color calibration and the multi-color calibration;
   computer-executable instructions for evaluating the single-color reproduction characteristics by using the acquired difference;
   computer-executable instructions for performing, after the evaluating, a multi-color calibration to correct multi-color reproduction characteristics of the forming based on a measuring result obtained when the measuring measures a multi-color image formed by the forming with a plurality of color recording agents;
   computer-readable instructions for executing the multi-color calibration according to the received instruction if the single-color reproduction characteristics are evaluated as being appropriate based on the acquired difference; and
   computer-readable instructions for switching processing so as to execute the single-color calibration again without following the received instruction if the single-color reproduction characteristics are evaluated as being inappropriate based on the acquired difference.

* * * * *